US010105805B2

(12) United States Patent
Grønås

(10) Patent No.: US 10,105,805 B2
(45) Date of Patent: Oct. 23, 2018

(54) CUTTING TOOL AND METHOD FOR CUTTING OPENINGS IN A BODY

(71) Applicant: 3PO Tools AS, Tistedal (NO)

(72) Inventor: Jon Arve Grønås, Tistedal (NO)

(73) Assignee: Tanjen Invent AS, Naerbø (NO)

( * ) Notice: Subject to any disclaimer, the term of this patent is extended or adjusted under 35 U.S.C. 154(b) by 274 days.

(21) Appl. No.: 15/032,450

(22) PCT Filed: Oct. 27, 2014

(86) PCT No.: PCT/NO2014/050200
§ 371 (c)(1),
(2) Date: Apr. 27, 2016

(87) PCT Pub. No.: WO2015/069116
PCT Pub. Date: May 14, 2015

(65) Prior Publication Data
US 2016/0263719 A1  Sep. 15, 2016

(30) Foreign Application Priority Data

Nov. 5, 2013  (NO) .................................... 20131465

(51) Int. Cl.
*B23Q 9/00*       (2006.01)
*B23P 13/02*      (2006.01)
(Continued)

(52) U.S. Cl.
CPC .............. *B23Q 9/0021* (2013.01); *B23C 1/20* (2013.01); *B23C 3/02* (2013.01); *B23D 51/02* (2013.01);
(Continued)

(58) Field of Classification Search
CPC ...... B23Q 9/0042; B23Q 9/0021; B23Q 9/02; B23Q 9/0057; B23C 1/20; B23C 3/02; B23D 51/025; B23D 51/02; B23P 13/00; B23P 13/02; B26F 1/3846; Y10T 29/49995; Y10T 409/30644
See application file for complete search history.

(56) References Cited

U.S. PATENT DOCUMENTS 2,854,076 A   9/1958  Kiem
3,124,182 A   3/1964  Silken
(Continued)

FOREIGN PATENT DOCUMENTS

EP        1923156       5/2008

OTHER PUBLICATIONS

International Search Report and Written Opinion PCT/NO2014/050200, dated Jan. 21, 2015.

*Primary Examiner* — Jermie Cozart
(74) *Attorney, Agent, or Firm* — Andrus Intellectual Property Law, LLP

(57) ABSTRACT

A device is arranged to be able to provide openings in a body. The device comprises a cutting head having a front and a rear. The cutting head is provided with a cutting device; a power transmission body arranged to be able to transmit power from a driving means to the cutting device; a drive unit holder, wherein the drive unit holder is adapted to be able to be arranged at a distance (A3) from the rear of the cutting head; at least one connecting body having a first and a second end portion, wherein the connecting body connects the cutting head to the drive unit holder; and a support arranged to be able to rotatably hold the device on a body.

21 Claims, 3 Drawing Sheets

(51) Int. Cl.
*B23C 1/20* (2006.01)
*B23C 3/02* (2006.01)
*B23D 51/02* (2006.01)

(52) U.S. Cl.
CPC ......... *B23P 13/02* (2013.01); *Y10T 29/49995* (2015.01); *Y10T 409/30644* (2015.01)

(56) References Cited

U.S. PATENT DOCUMENTS

| | | |
|---|---|---|
| 3,146,675 A | 9/1964 | Anderson |
| 3,276,326 A | 10/1966 | Gibbons et al. |
| 4,044,464 A | 8/1977 | Schiess et al. |
| 4,397,593 A | 8/1983 | Fordeck |
| 5,895,183 A | 4/1999 | McDaniel et al. |

CUTTING TOOL AND METHOD FOR CUTTING OPENINGS IN A BODY

CROSS-REFERENCE TO RELATED APPLICATIONS

This application is the U.S. national stage application of International Application PCT/NO2014/050200, filed Oct. 27, 2014, which international application was published on May 14, 2015, as International Publication WO 2015/069116 in the English language. The international application is incorporated herein by reference, in entirety. The international application claims priority to Norwegian Patent Application 201341465 filed Nov. 5, 2013, which is incorporated herein by reference, in entirety.

FIELD

The invention concerns a cutting tool. More specifically the invention concerns a cutting tool for providing openings in plate-shaped materials and wherein the form of the tool allows access near obstructions.

BACKGROUND

In the craft industry different tools are known for cutting holes in walls and boards. A kind of tool which is commonly used is the so-called holesaw. A holesaw is a circular sawing device which is usually connected to a drilling machine in order to provide a shearing force. The holesaw is generally shaped like a cup. The open end of the cup is provided with saw teeth, and the closed end of the cup is provided with a shaft. The shaft is connected to a rotating tool, as for instance a drilling machine. A considerable drawback connected to the use of this kind of holesaw is that the diameter of the hole which is to be cut is predetermined by the diameter of the holesaw. Another drawback is that increased diameter of the hole saw requires an increased torque in order to get sufficient rotation speed and cutting force. This puts restrictions on how large holes may be cut using common drilling machines. Holes with a diameter over 25 cm are problematic to provide by means of a holesaw and a common drilling machine.

Patent publication EP1923156 discloses a holesaw according to prior art, comprising a holesaw mandrel, a center bit, and a cage for the center bit and the holesaw mandrel. The cage comprises a polygonal shaft which transfers a rotational force for instance from a drilling machine to the center bit and the holesaw mandrel. This kind of holesaw has the drawback that the diameter of the hole is determined by the diameter of the holesaw mandrel and that the required torque becomes disproportionately high at larger hole diameters.

Patent publication U.S. Pat. No. 3,276,326 discloses a device for cutting of circular holes comprising a center point, a distance bar and a cutter head provided with for example an end mill. A power source is connected to the cutter head in order to provide a rotation of the mill. The disadvantage of this device is that the electric tool is situated close to the cutter head, and thus hinders access in situations where the cutter head has to cut close to another object. Access is for instance hindered when cutting holes in a wall where the hole has to be cut close to the wall or close to a corner. Patent publications U.S. Pat. No. 3,146,675 and U.S. Pat. No. 3,124,182 also disclose similar solutions having the same drawbacks as described for U.S. Pat. No. 3,276,326.

Patent publication U.S. Pat. No. 4,397,593 discloses a device for cutting circular holes, comprising a center bit and a mill connected to a series of gear wheels which again is enclosed by a house. A drilling machine may be connected to the center bit and transfers a rotary motion to the mill through the series of gear wheels. The distance from the center bit to the mill may be regulated by adjusting the series of gear wheels such that holes of different diameter may be cut. This inventions shows advantages compared to other prior art by the feature that the drilling machine may be connected to the center bit and that the size of the hole may be changed. However, the disadvantage of this solution is that the geometry of the house hinders the access in situations where the hole has to be cut close to an obstruction. Furthermore, the device has a limitation with regards to the smallest and the largest hole diameter which may be cut. When cutting very different hole diameters, different variants of the tool may be used, where the different variants have shorter or longer series of gear wheels arranged in houses of different sizes.

Thus, there exists a need for a device for cutting of openings in plate-shaped bodies, wherein the device has the following properties:

the device allows making of holes with a diameter larger than 20 cm using the power which is available from a common drilling machine;
 the diameter of the hole may be freely chosen; and
 the shape of the device allows for cutting of holes close to walls and corners.

SUMMARY

The invention has for its object to remedy or to reduce at least one of the drawbacks of the prior art, or at least to provide a useful alternative to prior art.

The object is achieved through features which are specified in the description below and in the claims that follow.

In a first aspect, the invention concerns a device arranged to be able to provide openings in a body, wherein the device comprises a cutting head having a front and a rear, and where the cutting head is provided with a cutting device; a power transmission body arranged to be able to transmit power from a driving means to the cutting device; a drive unit holder, where the drive unit holder is adapted to be able to be arranged at a distance from the rear of the cutting head; at least one connecting body having a first and a second end portion, wherein the connecting body connects the cutting head to the drive unit holder; and a support arranged to be able to rotatably hold the device on a body, such that a distance between the first end portion of the connecting body and the rotation axis is smaller than or the same as the distance between the front of the cutting head and the rotation axis.

The cutting device may comprise an oscillating or rotating cutting device, where the oscillating cutting device may comprise a cutting device chosen from the group consisting of a saw blade, nibblers and sheet metal shears, and where the rotating cutting device as an example may consist of a milling machine, a cut-off wheel or a rotating saw blade.

The drive unit holder may comprise the support, and the support may consist of a pointed body.

The drive unit holder may comprise a shaft and the shaft may be rotatably connected to the support. When the shaft is rotatably connected to the support, the support may comprise a drill.

The connecting body may comprise a rail and the cutting head may be connected to the connecting body. Furthermore, the drive unit holder may be displaceably connected to the rail.

The power transmission body may comprise a shaft. The shaft may be a polygonal shaft.

The drive unit holder may comprise a bevel gear drive.

The drive unit holder may comprise an input shaft.

The cutting head may be allocated a handle arranged to be able to assist an operator in moving the device along a desirable cutting line.

The at least one connecting body may constitute part of a chain mechanism.

In a second aspect, the invention concerns a method for cutting openings in a body by means of a device according to claim 1, wherein the method comprises;
A) to position the support at a desired distance from the cutting device;
B) to fasten the support at a desired distance from the cutting device;
C) to activate the power transmission body by means of a driving means; and
D) to move the cutting head in a cutting line around the rotation axis.

The method may prior to step A) further comprise;
A2) to drill a hole in the body; and
A3) to position the cutting device of the device in the hole.

The method may prior to step A2) further comprise;
A1) to drill a hole in the body for fastening of the support.

In a third aspect, the invention concerns a use of the device as described in order to create openings in a body.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
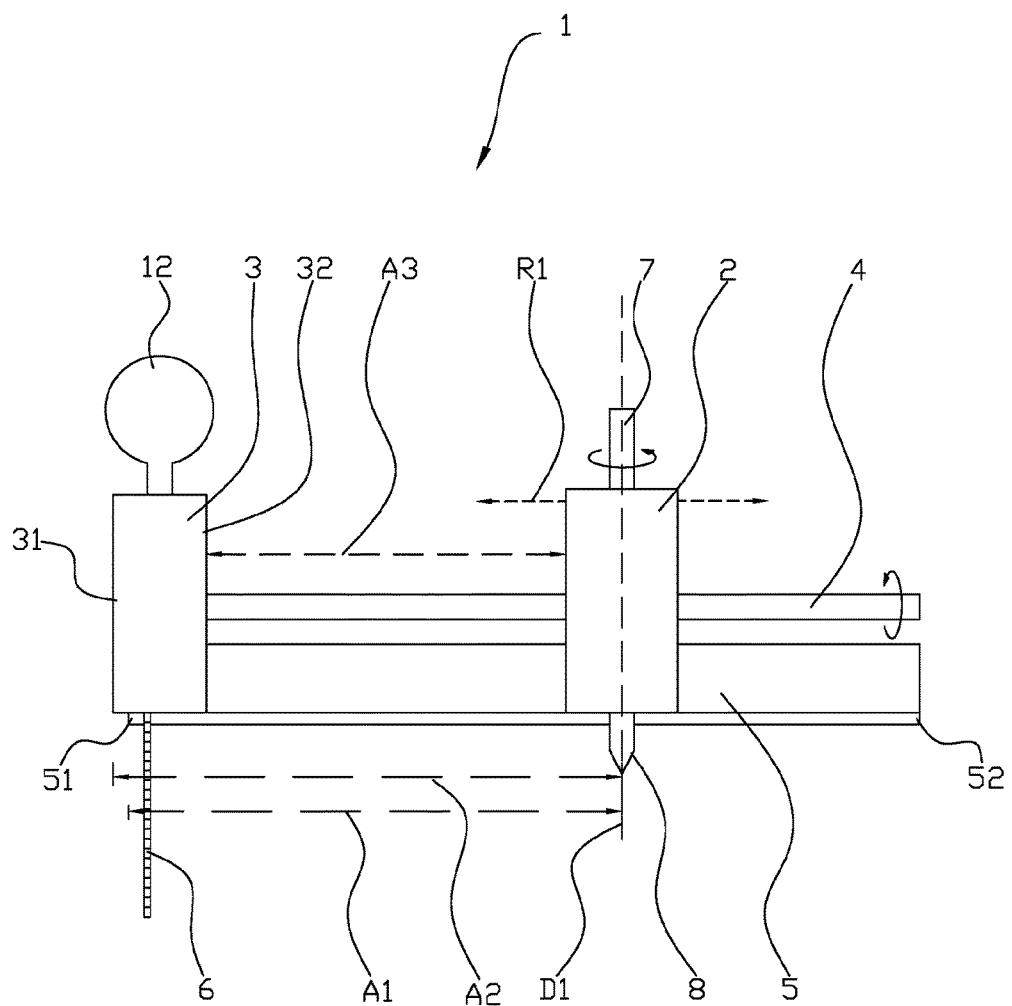
FIG. 1 shows a side view of the device in accordance with the invention.

In the description of the drawings reference to certain details is left out. These details are not important in order to point out what is new about the invention. These details may be of importance for manufacturing the device, but the reference to these is left out in order to make the description simpler and to render the invention clearer.

Same or similar elements will be denoted with the same reference numeral in the drawings.

In the following the reference numeral 1 denotes a device for cutting of openings in plate-shaped bodies in accordance with the invention. In the following the device 1 is referred to as a "hole cutter" in order to ease the description of the invention.

The hole cutter 1 as shown in FIG. 1 comprises a cutting head 3 having a front 31 and a rear 32, wherein the cutting head 3 is provided with a cutting organ 6 and a handle 12, and wherein the cutting head 3 further is fastened to an L-shaped rail 5. A shaft 4, which is guided through a drive unit holder 2, protrudes from the cutting head 3. The drive unit holder 2 comprises an input shaft 7 and a support 8. The drive unit holder 2 is displaceably connected to the rail 5.

There is a distance A2 between the center axis D1 of the support 8 and the front 31 of the cutting head 3, and a distance A1 between the center axis D1 of the support 8 and the end portion of the rail 5. The end portion 51 of the rail 5 does not protrude beyond the front 31 of the cutting head 3. The distance A1 is therefore smaller than the distance A2. A driving means (not shown) which is connected to the input shaft 7 is located at a distance from the front 31 of the cutting head 3. Since the end portion 51 of the rail 5 does not protrude beyond the front 31 of the cutting head 3 and since the driving means is located at a distance from the front 31 of the cutting head 3, it is achieved that the hole cutter 1 may be used close to an obstruction. The hole cutter 1 may for instance create openings close to a wall or close to a corner.

The cutting head 3 comprises a mechanism (not shown) for activation of the cutting organ 6. The mechanism is connected to the shaft 4. The mechanism is activated by rotation of the shaft 4. The shaft 4 is rotatably connected to the input shaft 7. The rotary connection between the shaft 4 and the input shaft 7 is provided by a bevel gear drive (not shown) housed by the drive unit holder 2. The shaft 4 is preferably constituted by a six-sided shaft 4. The gear wheel of the bevel gear drive which is connected to the shaft 4, is provided with a six-sided center hole which is complementary to the shaft 4. It is thus achieved that the drive unit holder 2 may be displaced along the rail 5 at the same time as the power transmission from the input shaft 7 is maintained.

The power transmission to mechanism of the cutting head 3 may possibly be carried out in alternative ways from that shown in the drawing, where an input shaft 7 being rotatably connected to the shaft 4, is used. A flexible shaft in the form of a wire or an elongated spring which in its one end is connected to the cutting head 3 mechanism and in its other end is connected to a driving means as for instance a drilling machine, may for example be used. The power transmission body may further comprise a synchronous belt, a cone belt, a flexible shaft, a series of gear wheels and any kind of rigid shaft 4 with a non-circular cross-section geometry.

The mechanism which is comprised by the cutting head 3 provides a movement of the cutting organ 6. The cutting organ 6 is in the drawing shown as a saw blade 6. The mechanism for providing an oscillating movement of the saw blade 6 may be visualized as different embodiments, for instance the mechanism may comprise a cam-mechanism where the saw blade 6 in its end portion is displaceably arranged in a groove in the cam.

It shall be understood from the invention that the cutting organ 6 may comprise other cutting organs, the cutting organ may for instance be comprised by a milling machine. In such an alternative embodiment the mechanism comprised by the cutting head 3 may for example be constituted by a bevel gear drive, such that a rotary motion of the shaft 4 is transformed into a rotary motion of the milling machine. The mechanism may further comprise a gear, such that the rotation speed of the milling machine becomes larger or smaller than the rotation speed of the shaft 4. By using a rotary saw blade 6 the saw blade may be connected to the end portion of the shaft 4. Thereby it is achieved that there is no longer a need for a mechanism comprised by the cutting head 3 for directing the cutting force towards a workpiece.

When using the hole cutter 1 the input shaft 7 is connected to a driving means, for instance a drilling machine, an electric motor, a pneumatic motor or another driving means known in the art.

Figure 2:
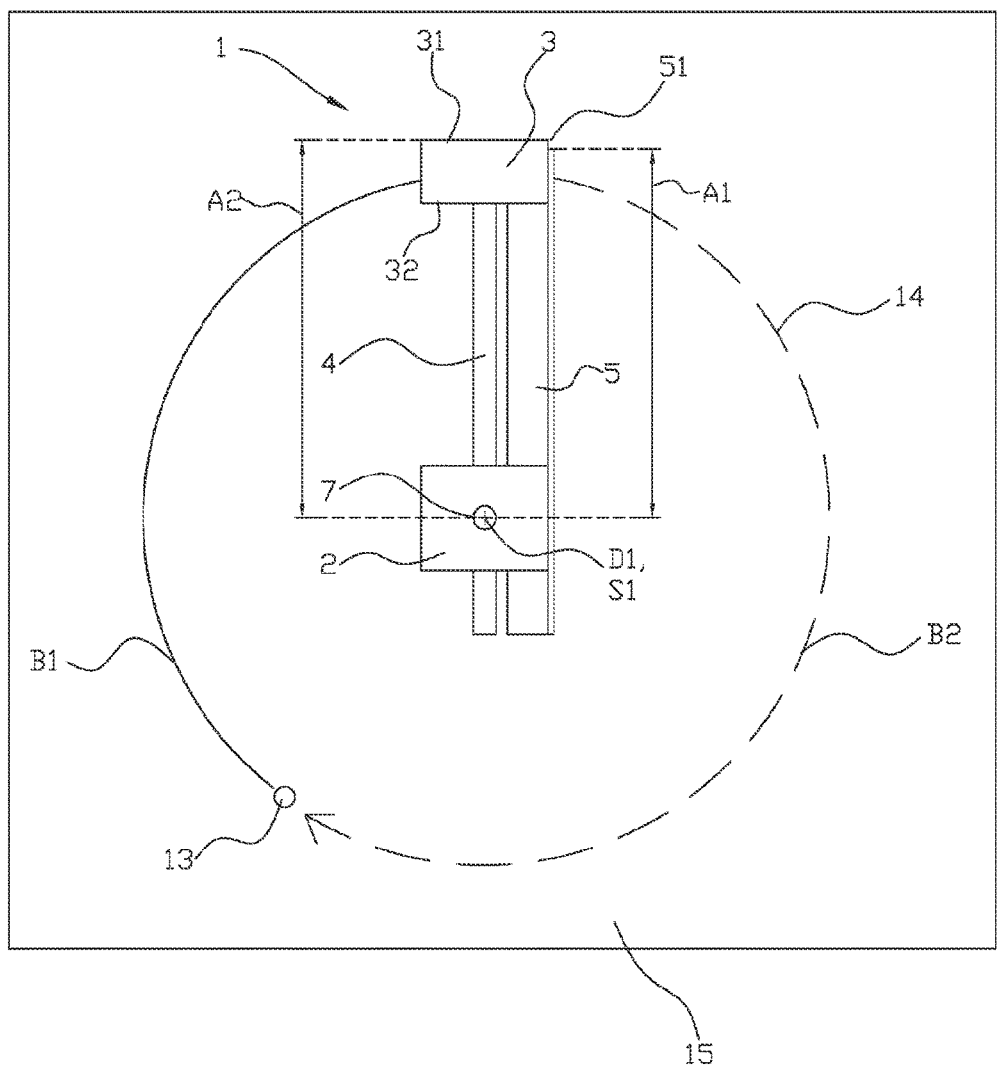
FIG. 2 shows at a smaller scale a top view of the device, and where the device is positioned on a plate-shaped body.

FIG. 2 shows the hole cutter 1 arranged on a plate-shaped body 15, for instance a wooden plate. When an opening is to be cut in the plate 15, a hole 13 is firstly drilled in the plate. Thereafter the hole cutter 1 is arranged on the plate 15 such that the cutting organ 6 is positioned in the hole 13, and such that the distance A2 between the center axis D1 of the support 8 and the front 31 of the cutting head 3 is adapted to the desired diameter of the opening which is to be cut in the plate 15. The support 8 (see FIG. 1) may be securely held in the center point 51 either by positioning the support 8 in a pre-drilled hole in the plate, or by shaping the support 8 with a point such that it may keep itself in position in the center point 51. The cutting organ 6 is activated by means of a driving means which is connected to the input shaft 7. The hole cutter 1 is thereafter moved in a circular line 14 around the center axis D1 of the opening. In order to ease the guiding of the hole cutter 1 in a circular line 14, the cutting head 3 is preferably provided with a handle 12, see FIG. 1. The cut line is marked by the continuous part B1 of the arrow 14, and the line which is still left to cut is marked by the dotted part B2 of the arrow 14 (see FIG. 2). The hole cutter 1 is moved along the line 14 one entire revolution such that a circular opening is formed in the plate 15.

In FIG. 2 is shown an example of a method where a hole 13 is pre-drilled in the plate such that the cutting organ 6 may be lead through the hole 13 before the cutting of the opening in the plate 15 is initiated. However, different possible forms of the cutting organ 6 which will make pre-drilling of the hole 13 unnecessary, may be imagined, for instance a saw blade 6 which is formed such that it can cut through the plate 15 the moment the saw blade 6 is set in oscillating motion and moved towards the plate 15. Furthermore, it will be unnecessary to pre-drill a hole 13 in the plate 15 if the cutting organ 6 is a milling machine or a rotating saw blade.

The support 8 is in FIG. 1 shown as a point fastened to the drive unit holder 2, but it must be understood from the invention that the support 8 may have various other geometries and embodiments as described in the following. When providing openings in plates 15 made of yielding materials, such as for instance wood, plaster and insulation plates, the support 8 is preferably constituted by a point. In an alternative embodiment the support 8 may be constituted by a drill connected to the input shaft 7, such that when the input shaft 7 rotates, the rotary motion is transferred to the drill. Thereby it is achieved that it is not necessary to pre-drill a hole 13 in order for the support 8 to be held securely in the plate 15. This is especially relevant where the plate 15 is formed in a hard material, such as for instance metal.

It may further be imagined that the cutting head 3 may be provided with a propulsion device (not shown), wherein the propulsion device for example may be constituted by wheels which are rotary connected to the mechanism comprised by the cutting head 3. Thereby a propulsion device is achieved which may assist an operator in feeding the hole cutter 1 at a constant speed along the cutting line 14. The rotary connection between the mechanism and the propulsion device may comprise a gear in order to be able to vary the propulsion speed of the hole cutter 1.

The rotary connection between the input shaft 7 and the support 8 may further comprise a clutch (not shown).

In FIG. 1 the support 8 is shown connected to the drive unit holder 2 but it shall be understood that the support 8 may be located at other positions on the hole cutter 1, for instance the support 8 may be displaceably fastened to the rail 5.

The drive unit holder 2 may be displaceably fastened to the rail 5. In the drawings it is not shown how the drive unit holder 2 is displaceably fastened to the rail 5 since devices and mechanisms for achieving displaceable fastening to a body are considered to be known to a skilled person, and are thus not discussed in more detail.

The rail 5 is in the drawings shown as an L-shaped rail but it should be understood that the rail 5 may comprise other types of rails of other geometries and sections, for instance the rail 5 may be constituted by a rail having a U-section. When using U-section it is achieved that a user of the hole cutter 1 is protected from unintentional contact with the shaft 4.

Figure 3:
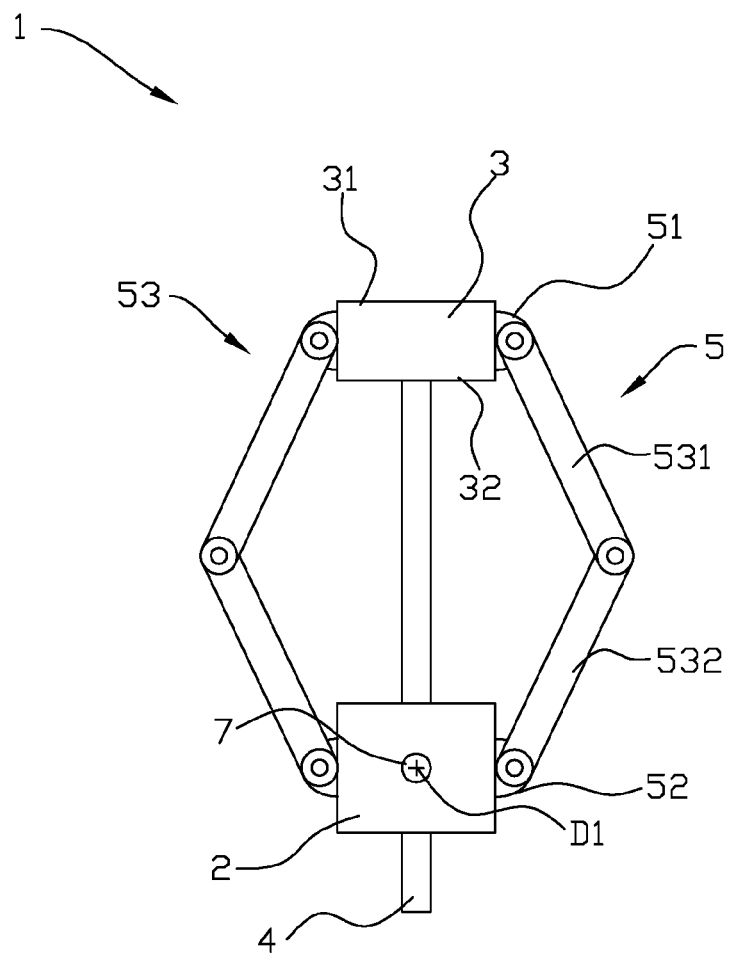
FIG. 3 shows an alternative embodiment of the device in accordance with the invention.

In FIG. 3 is shown an alternative embodiment of the hole cutter 1, wherein the connecting body 5 comprises a chain mechanism 53, and wherein the chain mechanism 53 on each side further comprises two chains 531, 532 which are hingedly connected. It should be understood from the invention that the connection body 5 may have various embodiments, such as a rail shown in FIG. 1 and a chain mechanism 53 as shown in FIG. 3, or other embodiments as for instance flexible rods, threaded rods and other mechanisms or bodies which connects the drive unit holder 2 to the cutting head 3.

The invention claimed is:

1. A device for providing openings in a body, wherein the device comprises:
    a cutting head having a front and a rear, wherein the cutting head is provided with a cutting device;
    a power transmission body arranged to be able to transmit power from a driving means to the cutting device;
    a drive unit holder, wherein the drive unit holder is arranged at a distance (A3) from the rear of the cutting head;
    at least one connecting body having a first and a second end portion, wherein the connecting body connects the cutting head to the drive unit holder; and
    a support arranged to be able to rotatably hold the device on a body, where a distance (A1) between the first end portion of the connecting body and the rotation axis (D1) is smaller than or the same as the distance (A2) between the front of the cutting head and the rotation axis (D1).

2. The device according to claim 1, wherein the cutting device comprises an oscillating cutting device.

3. The device according to claim 2, wherein the cutting device is selected from the group consisting of a saw blade, nibbler devices and sheet metal shears.

4. The device according to claim 1, wherein the cutting device comprises a rotating cutting device.

5. The device according to claim 4, wherein the cutting device is selected from the group consisting of milling machines, cut-off wheels and rotating saw blades.

6. The device according to claim 1, wherein the drive unit holder comprises the support.

7. The device according to claim 1, wherein the support is constituted by a pointed body.

8. The device according to claim 1, wherein the drive unit holder comprises a shaft, and wherein the shaft is rotatably connected to the support.

9. The device according to claim 8, wherein the support is constituted by a drill.

10. The device according to claim 1, wherein the connecting body comprises a rail.

11. The device according to claim 10, wherein the cutting head is connected to the connecting body.

12. The device according to claim 10, wherein the drive unit holder is displaceably connected to the rail.

13. The device according to claim 1, wherein the power transmission body comprises a shaft.

14. The device according to claim 13, wherein the power transmission body is constituted by a polygonal shaft.

15. The device according to claim 1, wherein the drive unit holder comprises a bevel gear drive.

16. The device according to claim 15, wherein the drive unit holder comprises an input shaft.

17. The device according to claim 1, wherein the cutting head is provided with a handle adapted to assist an operator in guiding the device along a desired cutting line.

18. The device according to claim 1, wherein the at least one connecting body constitutes part of a chain mechanism.

19. A method for cutting openings in a body via a device that comprises
 a cutting head having a front and a rear, wherein the cutting head is provided with a cutting device;
 a power transmission body arranged to be able to transmit power from a driving means to the cutting device;
 a drive unit holder, wherein the drive unit holder is arranged at a distance (A3) from the rear of the cutting head;
 at least one connecting body having a first and a second end portion, wherein the connecting body connects the cutting head to the drive unit holder; and
 a support arranged to be able to rotatably hold the device on a body, where a distance (A1) between the first end portion of the connecting body and the rotation axis (D1) is smaller than or the same as the distance (A2) between the front of the cutting head and the rotation axis (D1);
the method comprising:
 A) positioning the support at a desired distance from the cutting device;
 B) fastening the support at a desired distance relative to the cutting device;
 C) activating the power transmission body via a driving means; and
 D) moving the cutting head along a cutting line around the rotation axis (D1).

20. The method according to claim 19, wherein the method prior to step A) further comprises;
 A2) drilling a hole in the body; and
 A3) positioning the cutting device of the device in the hole.

21. The method according to claim 20, wherein the method prior to step
 A) or step A2) further comprises;
 A1) drilling a hole in the body arranged to be able to fasten the support.

* * * * *